(12) United States Patent
Hensel et al.

(10) Patent No.: US 10,874,969 B2
(45) Date of Patent: Dec. 29, 2020

(54) METHOD FOR CLEANING A FILTER OF A VACUUM CLEANING APPARATUS AND VACUUM CLEANING APPARATUS THEREFOR

(71) Applicant: Alfred Kärcher GmbH & Co. KG, Winnenden (DE)

(72) Inventors: Maic Hensel, Backnang (DE); Markus Oesterle, Althuette (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 600 days.

(21) Appl. No.: 15/269,080

(22) Filed: Sep. 19, 2016

(65) Prior Publication Data

US 2017/0001136 A1 Jan. 5, 2017

Related U.S. Application Data

(63) Continuation of application No. PCT/EP2014/055601, filed on Mar. 20, 2014.

(51) Int. Cl.
*B01D 46/00* (2006.01)
*A47L 9/19* (2006.01)
(Continued)

(52) U.S. Cl.
CPC ............ *B01D 46/0068* (2013.01); *A47L 9/10* (2013.01); *A47L 9/19* (2013.01); *A47L 9/20* (2013.01);
(Continued)

(58) Field of Classification Search
None
See application file for complete search history.

(56) References Cited

U.S. PATENT DOCUMENTS 6,192,550 B1 * 2/2001 Hamada .................... A47L 5/28
15/352
7,303,613 B2 12/2007 Rosenzweig
(Continued)

FOREIGN PATENT DOCUMENTS

| CN | 101779937 | 7/2010 |
| CN | 202983410 | 6/2013 |

(Continued)

*Primary Examiner* — Christopher P Jones
*Assistant Examiner* — Brit E. Anbacht
(74) *Attorney, Agent, or Firm* — Womble Bond Dickinson (US) LLP

(57) ABSTRACT

The invention relates to a method for cleaning a filter of a vacuum cleaning apparatus, wherein in operation of the vacuum cleaning apparatus the filter has suction air flowing therethrough, said suction air being generated by a fan, the method including measuring a first pressure at an inflow section of the filter, measuring a second pressure at an outflow section of the filter, determining a pressure drop at the filter as a pressure difference between the first pressure and the second pressure, determining a quantity characterizing a volume flow of the suction air in the outflow section of the filter, determining, from the pressure difference and the quantity that characterizes the volume flow, a quantity characterizing a flow resistance of the filter, and initiating a filter cleaning operation in dependence upon the determined quantity that characterizes the flow resistance of the filter.

10 Claims, 6 Drawing Sheets

(51) Int. Cl.
*A47L 9/20* (2006.01)
*A47L 9/28* (2006.01)
*A47L 9/10* (2006.01)

(52) U.S. Cl.
CPC ........ *A47L 9/2821* (2013.01); *B01D 2279/55* (2013.01)

(56) References Cited

U.S. PATENT DOCUMENTS

| | | | |
|---|---|---|---|
| 7,891,045 B2 | 2/2011 | Kim et al. | |
| 7,976,614 B2 * | 7/2011 | Eckstein | A47L 9/20 15/352 |
| 9,380,919 B2 | 7/2016 | Hensel et al. | |
| 9,585,533 B2 | 3/2017 | Hensel et al. | |
| 2008/0086835 A1 * | 4/2008 | Stewen | A47L 9/0072 15/347 |
| 2008/0092326 A1 * | 4/2008 | Morishita | A47L 9/106 15/352 |
| 2008/0092498 A1 * | 4/2008 | Stewen | B01D 46/10 55/283 |
| 2008/0201898 A1 | 8/2008 | Charbonneau et al. | |
| 2009/0000485 A1 * | 1/2009 | Valentini | A47L 9/20 96/403 |
| 2010/0307339 A1 * | 12/2010 | Tadrous | B01D 46/0063 95/280 |
| 2013/0019901 A1 * | 1/2013 | Gerhards | A47L 9/2821 134/21 |
| 2013/0239802 A1 * | 9/2013 | Troxell | B01D 46/0086 95/20 |
| 2013/0312792 A1 * | 11/2013 | Hensel | A47L 9/20 134/18 |
| 2013/0319478 A1 | 12/2013 | Hensel et al. | |
| 2014/0053865 A1 * | 2/2014 | Wieland | B01D 41/04 134/1 |
| 2015/0176545 A1 * | 6/2015 | Troxell | F02M 35/086 55/302 |
| 2016/0096134 A1 * | 4/2016 | Santini | B01D 46/0023 55/302 |
| 2016/0136557 A1 * | 5/2016 | Ragaller | B01D 46/0068 95/1 |

FOREIGN PATENT DOCUMENTS

| | | |
|---|---|---|
| DE | 20 2012 003 280 | 4/2012 |
| DE | 20 2012 003 282 | 4/2012 |
| EP | 0 453 177 | 10/1991 |
| EP | 2 548 490 | 1/2013 |
| EP | 2 644 076 | 10/2013 |
| JP | 4792476 | 10/2011 |
| WO | WO 98/02080 | 1/1998 |

* cited by examiner

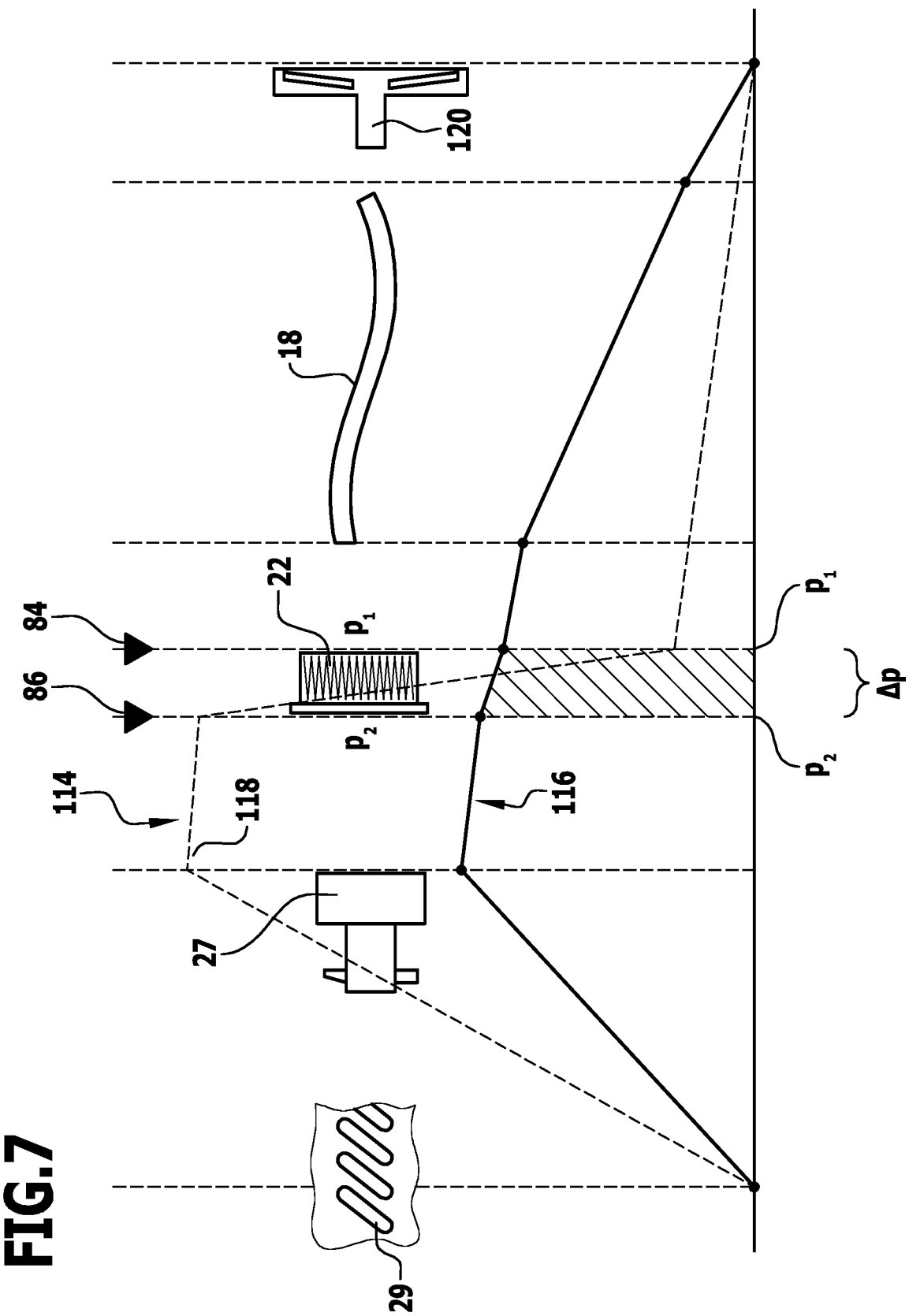

METHOD FOR CLEANING A FILTER OF A VACUUM CLEANING APPARATUS AND VACUUM CLEANING APPARATUS THEREFOR

This application is a continuation of international application number PCT/EP2014/055601 filed on Mar. 20, 2014, which is incorporated herein by reference in their entirety and for all purposes.

BACKGROUND OF THE INVENTION

The invention relates to a method for cleaning a filter of a vacuum cleaning apparatus, wherein in operation of the vacuum cleaning apparatus the filter has suction air flowing therethrough, said suction air being generated by a fan.

The invention further relates to a vacuum cleaning apparatus comprising a suction inlet, a dirt collection container, a filter device having at least one filter, a suction unit having a fan, wherein the dirt collection container is in flow communication with the suction unit via the filter device, a filter cleaning device for the filter device, a first pressure sensor which determines a first pressure in an inflow section of the filter device, a second pressure sensor which determines a second pressure in an outflow section of the filter device, and a control device which controls the filter cleaning device and is operatively connected for signal communication with the first pressure sensor and the second pressure sensor.

A method for cleaning a filter of a vacuum cleaner is disclosed in WO 2012/107103 A1, in which method the suction power of a suction unit is increased before an external air valve transitions to an open valve position, and is reduced again later.

A method for cleaning a filter of a vacuum cleaner is known from WO 2012/107595 A1, in which method an external air valve device has its energy supplied from a battery device.

A floor cleaning apparatus is known from JP 4792476, said apparatus having a filter with an inlet and an outlet. A first pressure sensor is arranged on the inlet of the filter. A second pressure sensor is arranged on the outlet of the filter. A controller is provided which activates a signal for initiating a filter cleaning process, wherein said activation is effected in response to a predetermined pressure differential between the first pressure sensor and the second pressure sensor. The controller can distinguish between the predetermined pressure differential which indicates an undesirable load on the filter and a pressure differential between the first pressure sensor and the second pressure sensor which represents a clogged condition of a flow path.

EP 2 548 490 A2 discloses a method for monitoring the fill level in a vacuum cleaner, wherein the vacuum cleaner comprises a drive unit which, in operation, is supplied with electrical power and creates a negative pressure and a volume flow and wherein, in operation, data for a measure of actual negative pressure and for a measure of actual volume flow are measured. Data for a volume flow-dependent characteristic curve are stored in a storage device. An operating point on the characteristic curve is determined based on the actual volume flow and an instantaneous fill level of the vacuum cleaner is determined based upon the actual negative pressure and the negative pressure pertaining to the operating point on the characteristic curve.

DE 20 2012 003 282 U1 discloses a suction device having at least one motor, a suction connector for a power tool to be connected to the suction device, at least one filter and a power tool socket to which the power tool is electrically connectable, wherein the suction device has at least one electrical current/power sensor which senses the current/power consumption of the power tool connected to the power tool socket and which is connected to a processor which provides a signal for cleaning the filter, taking into account the electrical current/power consumption value.

DE 20 2012 003 280 U1 discloses a suction device having at least one suction connection piece for a power tool, at least one motor, at least one filter and at least one flow space upstream of the filter and at least one flow space downstream of the filter. Each of the two flow spaces is provided with at least one measuring point having connected thereto at least one pressure sensor which is connected to a control signal device that sends a signal when the pressure differential between the pressures in the two flow spaces reaches a limit value.

EP 0 453 177 B1 discloses a powered mobile surface maintenance machine having an air exhaust system for dust control. A device is provided for shaking or jolting filters during the cleaning cycle so that accumulated dust is removed. Furthermore, an activatable control device is provided to initiate and carry out an unattended filter cleaning cycle sequentially on each dirty filter during machine operation. Furthermore, an activation device is provided to activate the control device, wherein the activation device comprises either an automatic device to sense the differential air pressure across at least one of the filters and to determine when it is at a predetermined differential air pressure level, or an automatic timing device which sends a signal to the control device, or a manual device for activating the control device.

SUMMARY OF THE INVENTION

In accordance with an embodiment of the invention, a method is provided which allows filter cleaning to be carried out on an as-needed basis.

In accordance with an embodiment of the invention, a method is provided comprising the steps of:
  measuring a first pressure at an inflow section of the filter;
  measuring a second pressure at an outflow section of the filter;
  determining a pressure drop at the filter as a pressure difference between the first pressure and the second pressure;
  determining a quantity characterizing a volume flow of the suction air in the outflow section of the filter;
  determining, from the pressure difference and the quantity that characterizes the volume flow, a quantity characterizing a flow resistance of the filter; and
  initiating a filter cleaning operation in dependence upon the determined quantity that characterizes the flow resistance of the filter.

The solution in accordance with the invention provides for taking into account, in addition to the pressure drop at the filter, the volume flow in a suction conduit at the filter.

In principle, the pressure drop at the filter changes as the filter becomes dirty (clogged). However, there are other influences of the flow path in the suction apparatus that also enter into the pressure drop at the filter. For example, any change in flow conditions may have a quantitative influence on said pressure drop. Geometric changes along the flow path and changes in the ground on which suction cleaning is performed may bring about changes in the pressure drop.

The solution in accordance with the invention provides for taking into account the volume flow of the suction air. It is thereby possible for other influencing quantities which, while they influence the pressure drop at the filter, do not change the flow resistance at the filter, to be eliminated, at least approximately. With this provision, it is for example ensured that a blockage in the suction hose does not automatically lead to a filter cleaning operation.

The method in accordance with the invention provides a simple way of implementing filter cleaning on an as-needed basis, said method eliminating or compensating for "potential disturbances" in the flow path outside a dirty filter condition. Filter cleaning then only occurs when needed.

Furthermore, additional filter test options may be implemented. For example, a test can be conducted as to whether filter recovery has failed to occur after several or multiple filter cleaning operations, and thus a determination can be made as to whether it is for example necessary to replace the filter.

In principle, the quantity that characterizes the volume flow of the suction air at the filter can be determined directly via a corresponding sensor. However, in an advantageous embodiment, said quantity can also be computed from a stored characteristic curve of the fan.

The quantity that characterizes the flow resistance of the filter is a loss coefficient which, unlike the pressure drop, characterizes the filter directly.

In an example of an embodiment, the determined quantity that characterizes the flow resistance is compared with a threshold value, and if said quantity is above the threshold value, a filter cleaning operation is initiated. This provides a simple way of making a determination as to whether or not a filter cleaning operation is to be performed. The threshold value, which in particular is or will be predetermined, is for example stored and was previously determined.

It is particularly advantageous for the quantity that characterizes the volume flow to be determined from a characteristic curve of the fan which indicates a dependence of the volume flow on a pressure in the outflow section of the filter. For example, such a characteristic curve can be measured in advance and then stored. The pressure in the outflow section is known, at least approximately, via the second pressure. It is then possible for a measure of the volume flow to be determined by computation, without an additional sensor having to be provided.

In particular, the second pressure is taken to be a measure of the pressure in the outflow section of the filter. It is thereby possible to determine with good approximation the pressure in a suction conduit between the fan and the filter.

The characteristic curve or a relationship approximating it was previously determined and is stored in a storage device and is stored in particular as a table of values. The quantity characterizing the volume flow can thereby be determined in a simple manner. In particular, there is no need for additional design or for additional component parts.

The quantity that characterizes the flow resistance is in particular determined as the quotient of the determined pressure difference and a function of the determined quantity that characterizes the volume flow. The quantity characterizing the flow resistance is in particular a loss coefficient. It can be easily determined from quantities measured and quantities determined by computation.

In particular, the quotient is calculated from the determined pressure difference and a power, in particular the second power, of the determined quantity that characterizes the volume flow. This gives a simple formula for a quantity that characterizes the flow resistance of the filter.

Provision may also be made for a test to be performed as to whether the threshold value is exceeded multiple times within a specified period of time. This would indicate that the filter no longer recovers despite multiple filter cleaning operations. It is then possible to output a warning indication to an operator, notifying him/her that a major intervention is required, such as replacement of the filter.

For example, alternatively or additionally a test is performed to determine if, after the exceeding of the threshold value which is a first threshold value, a second threshold value is exceeded, said second threshold value being greater than the first threshold value. For example, if after the exceeding of the first threshold value within a specified time period and performance of a filter cleaning operation, the test determines that a second, higher, threshold value is exceeded, then this may be a sign of a filter problem, in particular one that may require a major intervention. It is then possible for a corresponding warning indication to be output.

In particular, a warning signal is output if the threshold value is exceeded a minimum number of times within the specified time period and/or the second threshold value is exceeded. The warning signal, which may be for example a visual and/or audible signal, then indicates that the filter does not recover sufficiently.

In particular, the filter has external air admitted thereto for carrying out a filter cleaning operation. The filter is thereby, in a sense, blown clear. Alternatively or additionally, other operations can be used, such as mechanically shaking the filter.

It is then advantageous for an external air valve device to be controlled and, for cleaning the filter, to be brought from a closed valve position to an open valve position in order, in a sense, to blow the filter clear.

In accordance with an embodiment of the invention, a vacuum cleaning apparatus is provided, comprising a determination device which determines a quantity characterizing a volume flow of suction air at the filter device, wherein the control device comprises an evaluation device which determines, from a pressure difference between the first pressure and the second pressure and the quantity that characterizes the volume flow, a quantity that characterizes a flow resistance of the filter device, and wherein the control device comprises a threshold value test device which tests whether the determined quantity that characterizes the flow resistance is above a threshold value and if so, initiates a filter cleaning operation by controlling the external air valve device.

The method in accordance with the invention may be implemented on the vacuum cleaning apparatus constructed in accordance with the invention.

Advantageous embodiments of the vacuum cleaning apparatus constructed in accordance with the invention have already been explained in connection with the description of the method in accordance with the invention.

The determination device provides the quantity that characterizes the volume flow. The evaluation device uses this quantity and the determined pressure difference to compute a quantity that characterizes the flow resistance of the filter device. Using the threshold value test device, it is then in turn possible to perform a test, without substantially influencing the remaining flow path, as to whether or not filter cleaning is necessary.

In particular, the control device comprises a storage device in which is stored a characteristic curve of the fan or a relationship approximating said characteristic curve, wherein the characteristic curve indicates the dependence of the volume flow on a pressure in the outflow section of the filter device. Thus, it is possible to take into account (in particular in an implicit manner) events which, while they quantitatively contribute to the pressure drop at the filter device, are not caused by a dirty filter condition. From the characteristic curve or the relationship approximating it, it is easily possible to determine a volume flow or a quantity characterizing said volume flow in the outflow section of the filter device.

In particular, the determination device is integrated in the control device and the quantity that characterizes the volume flow is determined from the characteristic curve or from the relationship approximating it. A quantity characterizing the volume flow can thereby be determined without a corresponding measuring sensor having to be provided therefor.

It is advantageous for a warning indication to be provided which indicates a filter status and which is controlled by the control device. The warning indication can in particular indicate whether, after one or more filter cleaning operations, a relevant recovery of the filter device has failed to occur.

The vacuum cleaning apparatus may be configured as a stand-alone apparatus and in particular as a stand-alone vacuum cleaner or it may be integrated in a surface cleaning machine, such as a sweeping machine.

In particular, the method in accordance with the invention is implemented in operation of the vacuum cleaning apparatus. The method in accordance with the invention can be implemented using the vacuum cleaning apparatus constructed in accordance with the invention. The method in accordance with the invention can be implemented on the vacuum cleaning apparatus constructed in accordance with the invention.

The following description of preferred embodiments serves to explain the invention in greater detail in conjunction with the drawings.

BRIEF DESCRIPTION OF THE DRAWINGS

FIG. 7 is a schematic representation of the pressure conditions along a flow path in the vacuum cleaner of FIG. 1.

DETAILED DESCRIPTION OF THE INVENTION

Figure 1:
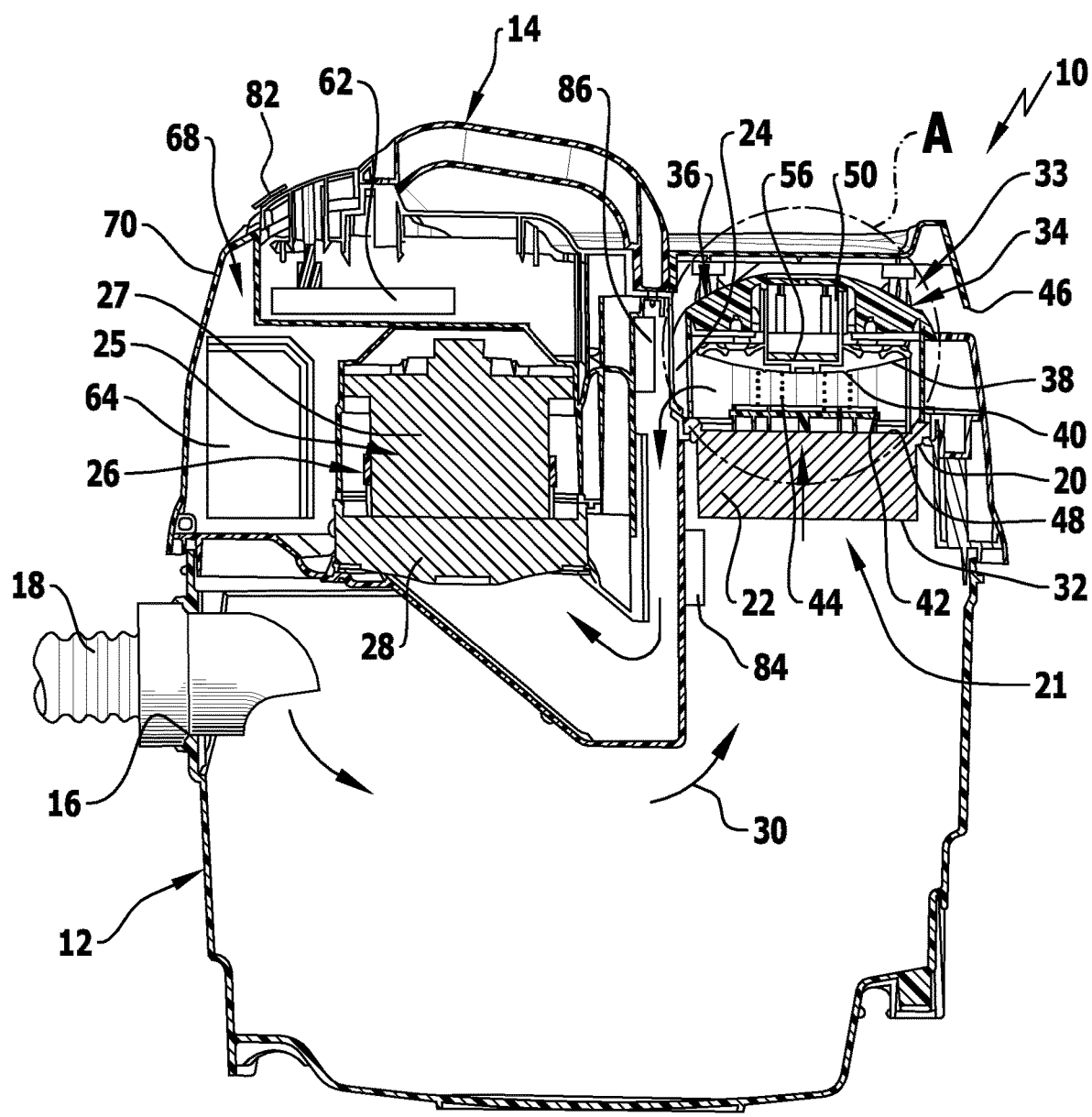
FIG. 1 is a schematic sectional view of an exemplary embodiment of a vacuum cleaner constructed in accordance with the invention.

An exemplary embodiment of a vacuum cleaner 10, which is shown schematically in a sectional view in FIG. 1, has a dirt collection container 12 on which a suction head 14 is mounted. The vacuum cleaner 10 is an example of a vacuum cleaning apparatus and is configured as a stand-alone (autonomous) device. The dirt collection container 12 has a suction inlet 16 to which a suction hose 18 can be connected in the usual manner. The suction head 14 seals off the dirt collection container 12 on the upper side thereof and forms a suction outlet 20 on which is held a filter device 21 having (at least) one filter 22. Adjoining the filter 22 is a suction conduit 24 via which the dirt collection container 12 is in flow communication with a suction unit 26. The suction unit 26 comprises an electric motor device 25 having (at least) one electric motor 27 and a fan 28 driven in rotation by the electric motor 27.

In operation of the vacuum cleaner 10, the suction unit 26 applies a negative pressure to the dirt collection container 12 so that a suction flow represented by arrows 30 in FIG. 1 is formed. Under the action of the suction flow 30, dirt-laden suction air can be drawn in via the suction inlet 16 into the dirt collection container 12, from where it can be sucked off by the suction unit 26. The suction air can be expelled to the surroundings by the suction unit 26 via exhaust air openings (FIG. 7) in the suction head 14.

The suction air flows through the filter 22 so that entrained solid particles are deposited on the dirty side 32 of the filter 22 facing towards the dirt collection container 12. Therefore, the filter 22 needs to be cleaned from time to time; otherwise, it develops increasing resistance to flow, whereby the suction effect of the vacuum cleaner 10 is adversely affected.

Figure 2:
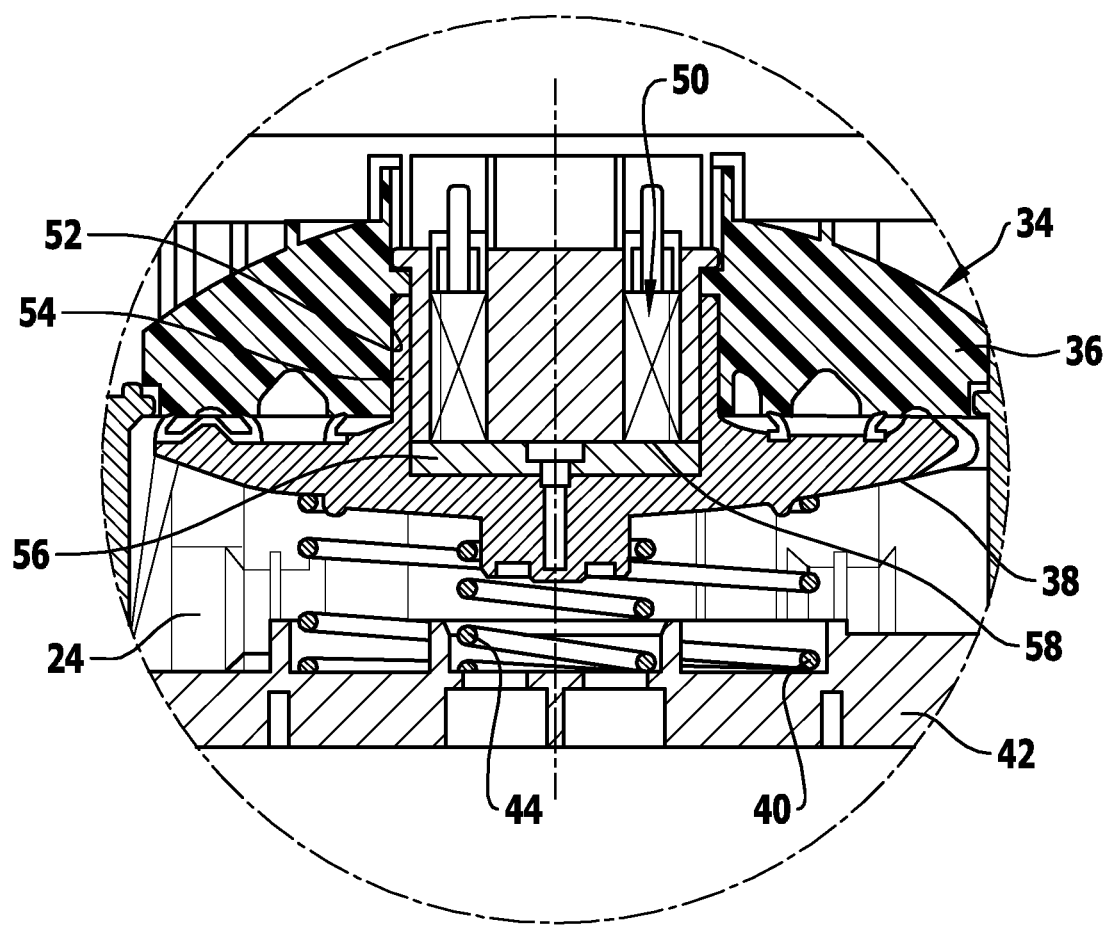
FIG. 2 is an enlarged representation of an external air valve device of the vacuum cleaner in accordance with FIG. 1.

For cleaning the filter 22, a filter cleaning device 33 which is configured as an external air valve device 33 having (at least) one external air valve 34 (shown enlarged in FIG. 2) is arranged above the filter 22 in the suction head 14. It comprises a valve holder 36 which is held stationary in the suction head 14 and forms a valve seat for a movable valve body in the form of a valve disk 38. The valve disk 38 is biased in a direction towards the valve holder 36 by a closing force provided by a closing spring 40. The closing spring 40 is clamped between a plate-like filter holder 42 which has a plurality of flow passages and is held stationary in the suction head 14, and the valve disk 38. In addition to the closing spring 40, the filter holder 42 carries a resilient stop element in the form of a stop spring 44. In particular (and preferably like the closing spring 40), the stop spring 44 has a linear characteristic. It is formed as a coil spring for example. Unlike the closing spring 40, the stop spring 44 is not biased in the closed position of the valve disk 38. Only when the valve disk 38 lifts off the valve seat of the valve holder 36 does the stop spring 44 come into contact with the underside of the valve disk 38, and continued movement of the valve disk 38 causes the stop spring 44 to be compressed somewhat. It thereby exerts an increasing restoring force on the valve disk 38 and accelerates the movement of the valve disk 38 from its closed valve position (shown in FIG. 2) via an open valve position and back to the closed valve position. In the open valve position, the valve disk 38 assumes a position at a distance from the valve holder 36, which forms the valve seat.

The valve holder 36 has a plurality of through-openings, not shown in the drawing, the mouth regions of which are closed off by the valve disk 38 when the latter assumes its closed valve position. At a level of the valve holder 36, the suction head 14 has a lateral opening 46. External air can flow into the through-openings of the valve holder 36 via the lateral opening 46. When the valve disk 36 assumes its open valve position spaced relative to the valve holder 36, the lateral opening 46 is in flow communication with the suction conduit 24 via the through-openings of the valve holder 36 and external air can be applied to the clean side 48 of the filter 22 facing away from the dirt collection container 12. When the valve disk 38 assumes its closed valve position, the flow communication between the lateral opening 46 and the suction conduit 24 is interrupted.

In a central region, the valve holder 36 carries an electromagnet 50. The electromagnet 50 is surrounded in a circumferential direction by an annular space 52 which has extending thereinto a guide sleeve 54 integrally formed on the valve disk 38 on the upper side thereof. The guide sleeve 54 receives a magnetizable element, for example in the form of an iron plate 56, which in the closed valve position of the valve disk 38 contacts a free end edge 58 of the electromagnet 50 and in combination with the electromagnet 50 forms a closed magnetic circuit.

The electromagnet 50 is in electrical communication, via a current supply line 60 (FIG. 3), with a(n) (electronic) control device 62 arranged in the suction head 14. During normal suction operation of the vacuum cleaner 10, a supply current is applied to the electromagnet 50 by the control device 62. As a result of the magnetic field generated thereby, the valve disk 38 is reliably held in its closed position. The holding force of the electromagnet 50 is assisted by the spring force of the closing spring 40.

If the supply of current to the electromagnet 50 from the control device 62 is interrupted, then the magnetic holding force acting on the valve disk 38 does not occur and the valve disk 38 is lifted off the valve seat against the action of the closing spring 40 due to the pressure difference acting on the valve disk 38, said pressure difference resulting from the difference between the outside pressure of the external air in the region of the valve holder 36 and the inside pressure within the suction conduit 24. A sudden burst of external air is then allowed to pass through the through-openings of the valve holder 36 and into the suction conduit 24, and the external air is applied to the clean side 48 of the filter 22 in a sudden burst. This causes a mechanical shock to be applied to the filter 22. Furthermore, external air passes through the filter 22 in counterflow direction, i.e. counter to the flow direction 30 during normal suction operation. As a result, effective cleaning of the filter 22 is achieved.

In an exemplary embodiment, energy supply for the vacuum cleaner 10 is provided by a rechargeable battery device 63. This comprises for example two rechargeable batteries 64, 66. The battery device 63 comprises for example one or more lithium-ion accumulators. These are arranged laterally beside the suction unit 26 in a battery compartment 68 of the suction head 14. The battery compartment 68 is accessible to the user for exchange of the batteries 64, 66 via a swing-out door 70.

The electronic control device 62 is arranged in the suction head 14 above the suction unit 26 and is in electrical communication with the batteries 64 and 66 via supply lines 72, 73, 74, 75. At the input side, the control device 62 has connected thereto a push button 82 that can be manually actuated by the user and is arranged on the upper side of the suction head 14. The user can (manually) initiate a filter cleaning process by actuating the push button 82.

The battery device may also comprise a fan device for cooling the batteries 64, 66 (not shown in the drawing). When accumulators that need to be cooled are used as batteries, this then allows for operation of the battery device to be implemented in a manner that is gentle on the accumulators. The fan device in turn receives its electrical energy for operation preferably from the batteries 64, 66 when running on battery power.

In one embodiment, the electronic control device 62 is arranged on a circuit board. Further, the circuit board has arranged thereon a receptacle for the battery device 63. In particular, the receptacle receives the batteries 64, 66. A fan device of the battery device 63 can also be arranged in the receptacle.

The control device 62 further comprises electronics for controlling and/or monitoring the battery device 63. By virtue of the control device 62, which controls the electric motor device 25, it is for example possible to control the fan device in such a manner that the latter is operated correspondingly to the control of the electric motor device 25. By way of example, turning off the electric motor 27, which is controlled by the control device 62, also turns off the fan device (optionally after a time delay). It is for example also possible for the fan device to be turned off when in filter cleaning mode.

Furthermore, a control process can then be performed via the control device 62 which allows operating the battery device 63 in a gentle manner while optimizing for maximizing battery capacity. For example, a process of charging the battery device 63 can then also be appropriately controlled or monitored via the control device 62. Furthermore, the "ageing" process of the battery device 63 can be monitored via the control device 62.

In an alternative embodiment, the vacuum cleaner 10 is supplied with mains current for its energy supply. Another embodiment implements adjustment options for adjusting whether the energy comes from the mains grid or from a battery device (see below).

A first pressure sensor 84 is arranged upstream (in an inflow section) of the filter 22, and a second pressure sensor 86 is arranged downstream (in an outflow section) of the filter 22, these being signally and operatively connected to the control device 62 and each providing a pressure-dependent control signal. The first pressure sensor 84 measures a pressure $p_1$ upstream of the filter 22 against atmosphere. The second pressure sensor 86 measures a pressure $p_2$ downstream of the filter 22 against atmosphere. The pressure $p_2$ is also a negative pressure which is created by the fan 28. By way of the two pressure sensors 84 and 86, the pressure difference $\Delta p = p_1 - p_2$ between an inflow section and an outflow section of the filter 22, occurring at the filter 22, can be determined.

As has already been mentioned, filter cleaning is effected by momentarily interrupting the supply of current to the electromagnet 50 by the control device 62.

Figure 4:
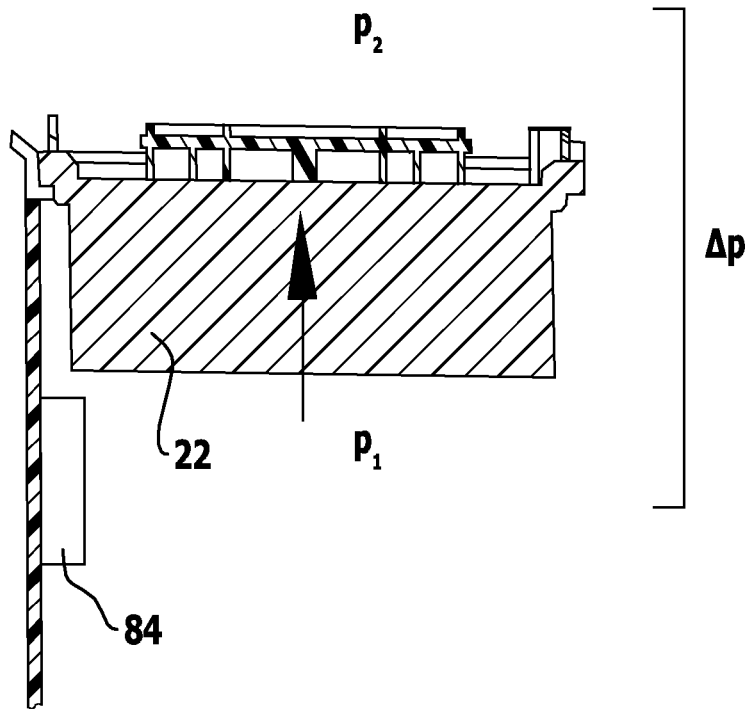
FIG. 4 is an enlarged view of the filter device in accordance with FIG. 1, showing the pressure conditions.

The time-related course of the supply current that is provided to the electromagnet 50 by the control device 62 is described in PCT/EP2011/052039, or US 2013/0312792, filed on Feb. 11, 2011, which is incorporated herein and made a part hereof by reference in its entirety and for all purposes: At a point in time $t_2$ (see FIG. 4 in PCT/EP2011/052039 or US 2013/0312792), the supply of current to the electromagnet 50 is interrupted so that the external air valve 34, starting from its closed valve position, transitions to its open valve position, and at a subsequent point in time $t_3$ the supply of current to the electromagnet 50 is re-established so that the external air valve 34 resumes its closed valve position. In the illustrated exemplary embodiment, the supply of current is interrupted three times in rapid succession so that a sudden burst of external air is applied to the clean side 48 of the filter 22 three times in succession and a substantial portion of said external air is passed through the filter 22 in counterflow direction. This causes solid particles adhering to the dirty side 32 to be dislodged therefrom. The filter cleaning process is completed at the end of the third current interruption, i.e. at the point in time $T_E$.

In such an exemplary embodiment, a complete cleaning process therefore comprises three opening and closing movements of the external air valve in rapid succession. The length of the time interval between the points in time $t_2$ and $t_3$ may for example be 90 milliseconds. Following a filter cleaning process, normal suction operation resumes by supply current being applied to the electromagnet 50 by the control device 62 and by the external air valve 34 maintaining its closed valve position. During normal suction operation, the suction power of the suction unit 26 is kept constant. In time-controlled filter cleaning, a period of suction operation of for example 15 seconds is followed by another filter cleaning process in which external air is supplied three times in sudden bursts, as explained above. Preferably, the length of the time interval between two filter cleaning processes is capable of being adjusted manually. Alternatively or additionally, a filter cleaning process can be initiated manually by the push button 82 and/or in a sensor-controlled manner by the pressure sensors 84, 86.

Figure 3:
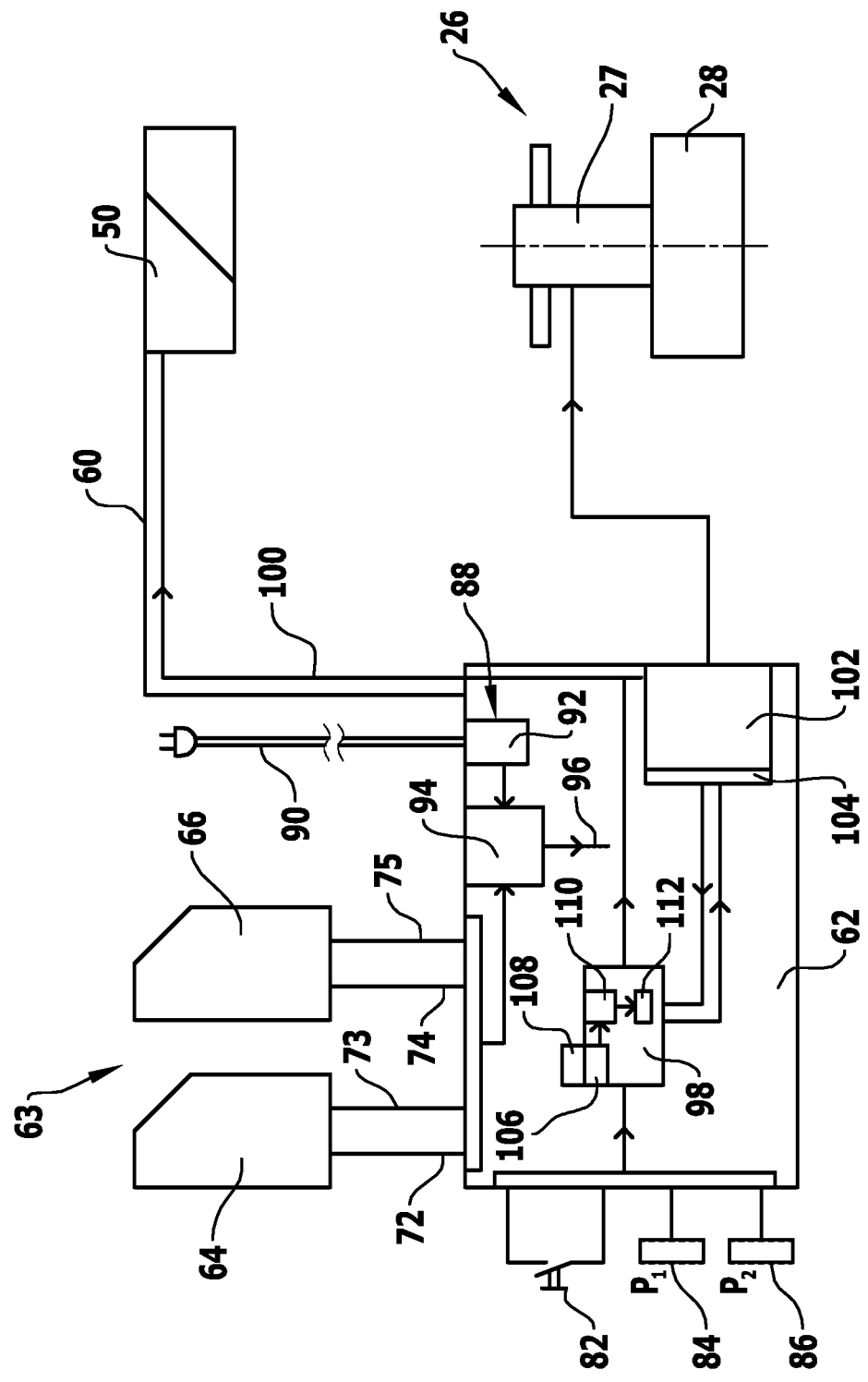
FIG. 3 is a block diagram of an exemplary embodiment of a control device of the vacuum cleaner in accordance with FIG. 1.

The vacuum cleaner 10 comprises a mains voltage supply device 88 (FIG. 3) by which the vacuum cleaner 10 can optionally or adjustably be supplied with mains current for its energy supply. FIG. 3 indicates an associated mains cable, designated by the reference numeral 90. It is then possible for a user to select whether energy is supplied via the mains voltage supply device 88 or the battery device 63.

The mains voltage supply device 88 comprises a rectifier 92 which provides direct current or direct voltage at an output thereof.

The control device 62 has a supply subunit 94 via which the components of the vacuum cleaner 10 are supplied with electrical energy. The supply subunit 94 provides the required electrical energy to the electromagnet 50 via the current supply line 60. It provides the electrical energy for powering the control device 62. It provides the electrical energy for controlling and actuating the electric motor 27. The corresponding electrical energy is delivered at an output (indicated at 96 in FIG. 3).

The supply subunit 94 can be formed by the battery device 63 or by the mains voltage supply device 88. It may also comprise a switch or the like which is used to manually or automatically adjust whether the vacuum cleaner 10 is supplied with energy from the rechargeable battery device 63 or from the mains voltage supply device 88.

The control device 62 comprises an external air valve control subunit 98. This is signally and operatively connected to the push button 82, the first pressure sensor 84 and the second pressure sensor 86. These provide corresponding signals to the external air valve control subunit 98, which then correspondingly controls the electromagnet 50 via a signal line 100. The external air valve control subunit 98 controls the electromagnet 50 in such a manner that the magnetic holding force acting on the valve disk 38 is released and hence a filter cleaning process is performed when a manual initiation process by the push button 82 is detected.

In an embodiment, the electric motor 27 is a permanent magnet-excited synchronous motor. In a permanent magnet-excited synchronous motor, the rotor has a plurality of permanent magnets. A stator is provided with coils which are controlled by the control device 62. The control is such that an electronic commutation process takes place. To this end, the control device 62 has (at least) one controller 102 which correspondingly controls the electric motor 27 and in particular the coils in the stator of the electric motor 27.

Control of the electric motor 27 by the controller 102 is in particular by pulse width modulated signals. The electric motor 27 is thereby supplied with the corresponding energy by control signals.

The electric motor 27 is in particular a brushless permanent magnet motor (EC motor). Using such a motor can achieve rotational speeds of for example 20,000 rpm or more with high efficiency and low noise. (Lower rotational speeds can also be achieved.)

In an exemplary embodiment, the electric motor is a three-phase motor and in particular a permanent magnet-excited three-phase synchronous motor. Provision may also be made for the permanent magnet-excited synchronous motor as the electric motor 27 to be only single-phase or two-phase.

In an embodiment, the control device 62 comprises a motor control subunit 104 which is in particular part of the controller 102 and is signally and operatively connected to the external air valve control subunit 98. In principle, a unidirectional connection may be provided in which either the external air valve control subunit 98 provides the motor control subunit 104 with corresponding signals which characterize whether or not a filter cleaning process is performed, or the motor control subunit 104 provides the external air valve control subunit 98 with signals regarding the motor control of the electric motor 27. A bidirectional data connection may also exist in which motor control data and external air valve control data are exchanged between the external air valve control subunit 98 and the motor control subunit 104.

It is thereby possible for a corresponding external air valve control to be taken into account directly in the motor control. Alternatively or additionally, it is possible for motor control data to be taken into account in the external air valve control.

The vacuum cleaner 10 further comprises a determination device 106 which determines a quantity Q characterizing a volume flow of suction air, said quantity Q characterizing the volume flow being determined in the outflow section of the filter 22.

In principle, provision may be made for a volume flow sensor to be arranged in the outflow section of the filter 22 and, in particular, for the volume flow Q to be then measured directly.

In an exemplary embodiment, the determination device 106 is integrated in the control device 98. It determines the quantity Q characterizing the volume flow from a characteristic curve of the fan 28 or from a relationship approximating said characteristic curve. This will be explained in greater detail below.

The control device 98 further comprises a storage device 108 which stores data for the characteristic curve or the relationship approximating said characteristic curve.

Furthermore, the control device 98 comprises an evaluation device 110. The evaluation device determines, from the data from the first pressure sensor 84 and the second pressure sensor 86, transmitted to the control device, and further from the data provided by the determination device 106, a quantity that is characteristic of the flow resistance of the filter 22.

The control device 98 further comprises a threshold value test device 112. Said threshold value test device 112 receives data from the evaluation device 110 and tests whether or not a determined quantity that is characteristic of the flow resistance of the filter 22 exceeds a threshold value, and if the threshold value is exceeded, a filter cleaning operation is initiated by a corresponding control signal being sent to the electromagnet 50.

The filter cleaning control scheme works as follows:

FIG. 7 is a schematic representation of the pressure conditions existing along a suction air flow path of the vacuum cleaner 10. The pressures are related to atmospheric pressure, and in FIG. 7 negative pressures with respect to atmosphere (which create a suction flow) are shown with positive sign. The purpose of FIG. 7 is to qualitatively explain the pressure conditions.

FIG. 7 shows an exemplary case of a heavily soiled filter 22 represented in broken lines (reference numeral 114) and an exemplary case of a less-than-heavily-soiled (clogged) filter 22 represented as solid lines (reference numeral 116).

Driven by the electric motor 27, the fan 28 of the suction unit 26 generates a suction flow. A negative pressure 118 relative to atmospheric pressure is generated. This negative pressure 118 is present in the suction conduit 24.

Between the fan 28 and the exhaust air openings 29, the pressure rises to atmospheric pressure.

The above-mentioned negative pressure 118 in the suction conduit 24 is present between the fan 28 and the filter 22 and may experience a drop (in the sense that it drops to a lower value) due to the flow path.

The pressure downstream of the filter 22, i.e. in the outflow section of the filter 22, is the pressure $p_2$, which is measured by the second pressure sensor 86. The pressure $p_2$ is a good measure of the negative pressure 118 in the suction conduit 24.

The pressure upstream of the filter 22, i.e. at the inflow section of the filter 22, is the pressure $p_1$, which is measured by the first pressure sensor 84. The filter has a pressure drop thereacross of $\Delta p = p_1 - p_2$. The more clogged the filter becomes, the greater this pressure drop $\Delta p$ becomes.

Further pressure drop is experienced along the path between the inflow section of the filter 22 and the suction inlet 16. A pressure drop also occurs in the suction hose 18. A pressure drop also occurs inside a nozzle 120 connected to the suction hose 18. The pressure existing outside the nozzle 120 is again atmospheric.

The pressure drop occurring in the filter 22 depends on how clogged the filter is, as is apparent from the comparison of the curves 114 and 116 of FIG. 7. The pressure course in the further flow path also depends on how dirty the filter 22 is.

In principle the pressure drop $\Delta p$ across the filter 22 also depends, aside from the dirtiness of the filter 22, on the remaining flow path inside the vacuum cleaner 10.

The solution in accordance with the invention takes into account, with respect to filter cleaning control, a volume flow Q of the suction air in the suction conduit 24.

As mentioned above, this volume flow can in principle be measured directly by a corresponding sensor. In an exemplary embodiment of simple design, the volume flow is determined by calculation:

The fan 28 has a characteristic curve with respect to the (negative) pressure 118 in the suction conduit 24.

As mentioned above, the pressure $p_2$ measured by the second pressure sensor 86 is a suitable measure of the pressure 118 in the suction conduit 24.

Figure 5:
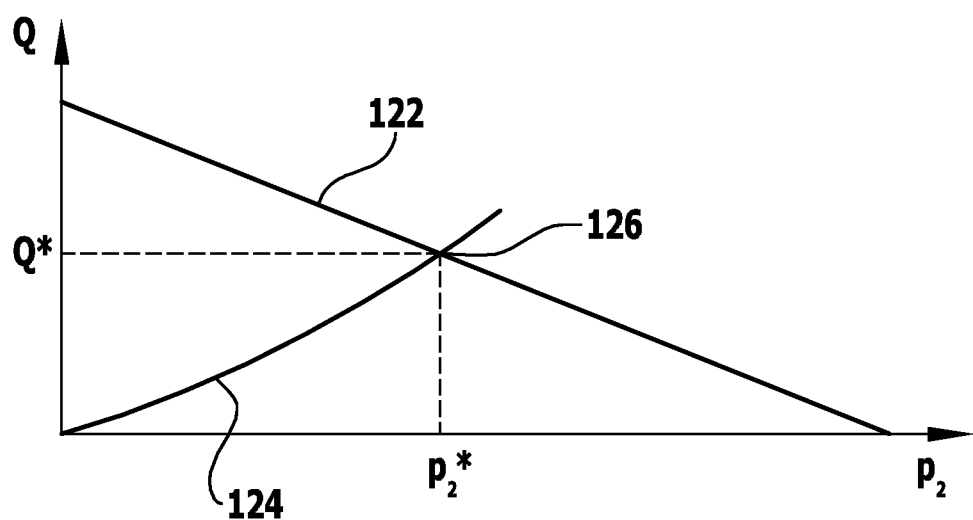
FIG. 5 is a schematic representation of a characteristic curve of a fan of the vacuum cleaner of FIG. 1 and a characteristic curve of the vacuum cleaner of FIG. 1.

An exemplary embodiment of a characteristic curve of the fan 28 in dependence on the pressure $p_2$ is shown in FIG. 5 and indicated therein by reference character 122. For small pressures $p_2$ (small pressures 118), the volume flow is high, and the higher the pressure $p_2$ becomes, i.e. the more it approximates atmospheric pressure, the smaller the volume flow becomes.

For (at least some) commercially available fans 28, the characteristic curve 122 is at least approximately linear.

It has been shown that even when the characteristic curve is not linear, a linear approximation is usually sufficient in carrying out the method in accordance with the invention.

The vacuum cleaner itself has a characteristic curve 124 with respect to the dependence of the volume flow on the pressure 118. Said characteristic curve 124 depends on the entire flow path in the vacuum cleaner 10, including the suction hose 18 and the nozzle 120. At small pressures $p_2$, the volume flow is low, while pressure increase increases the volume flow.

In operation of the vacuum cleaner 10, a pressure $p_2^*$ occurs at a volume flow $Q^*$ at which the characteristic curve 124 intersects the characteristic curve 122. The corresponding point 126 may vary during operation. The point 126 depends in principle on the configuration of the flow path and also, for example, on how long and what diameter the suction hose 18 is and how the nozzle 120 is configured. It may further vary depending on the nature of the surface upon which the nozzle 120 acts.

FIG. 5 shows that with the pressure 118 known, it is possible to determine from the characteristic curve 122 the volume flow at least as the quantity Q that characterizes the volume flow (as an approximation to the volume flow). The pressure $p_2$ is determined by the second pressure sensor 86.

The characteristic curve 122 or the relationship that approximates it is stored for example as a table of values in the storage device 108. To this end, the characteristic curve was previously measured and stored in the storage device 108.

The pressure drop $\Delta p = p_1 - p_2$ at the filter 22 can be determined from the measured values $p_1$ and $p_2$. Furthermore, the volume flow Q in the suction conduit 24, i.e. in the outflow section of the filter 22, is at least approximately known from the pressure $p_2$ and the characteristic curve 122. From this, the evaluation device 110 in turn then determines a quantity characterizing the flow resistance of the filter 22. Said quantity characterizing the flow resistance is determined in particular as the quotient of the pressure difference $\Delta p$ and a function of the determined volume flow.

In an exemplary embodiment, a loss coefficient of the filter 22 is calculated as $$c_W = \frac{\Delta p}{Q^2} \quad (1)$$

The determined volume flow (or the quantity Q characterizing the volume flow) enters into this loss coefficient of the filter 22 as a power to two.

Equation (1) lacks a proportionality factor. The threshold value test device 112 performs a test as to whether or not the quantity determined according to equation (1) exceeds a predetermined threshold value. Since a proportionality factor does not matter for this threshold value test (as it would be included in the threshold value), it was omitted from equation (1).

One or more threshold values against which the test is made were previously determined and are in particular stored in the storage device 108.

If the quantity $c_w$, calculated in accordance with equation (1) and characterizing the flow resistance, is found to exceed the predetermined threshold value in the test, a filter cleaning operation is initiated by the control device 98 sending a corresponding control signal to the electromagnet 50.

Figure 6:
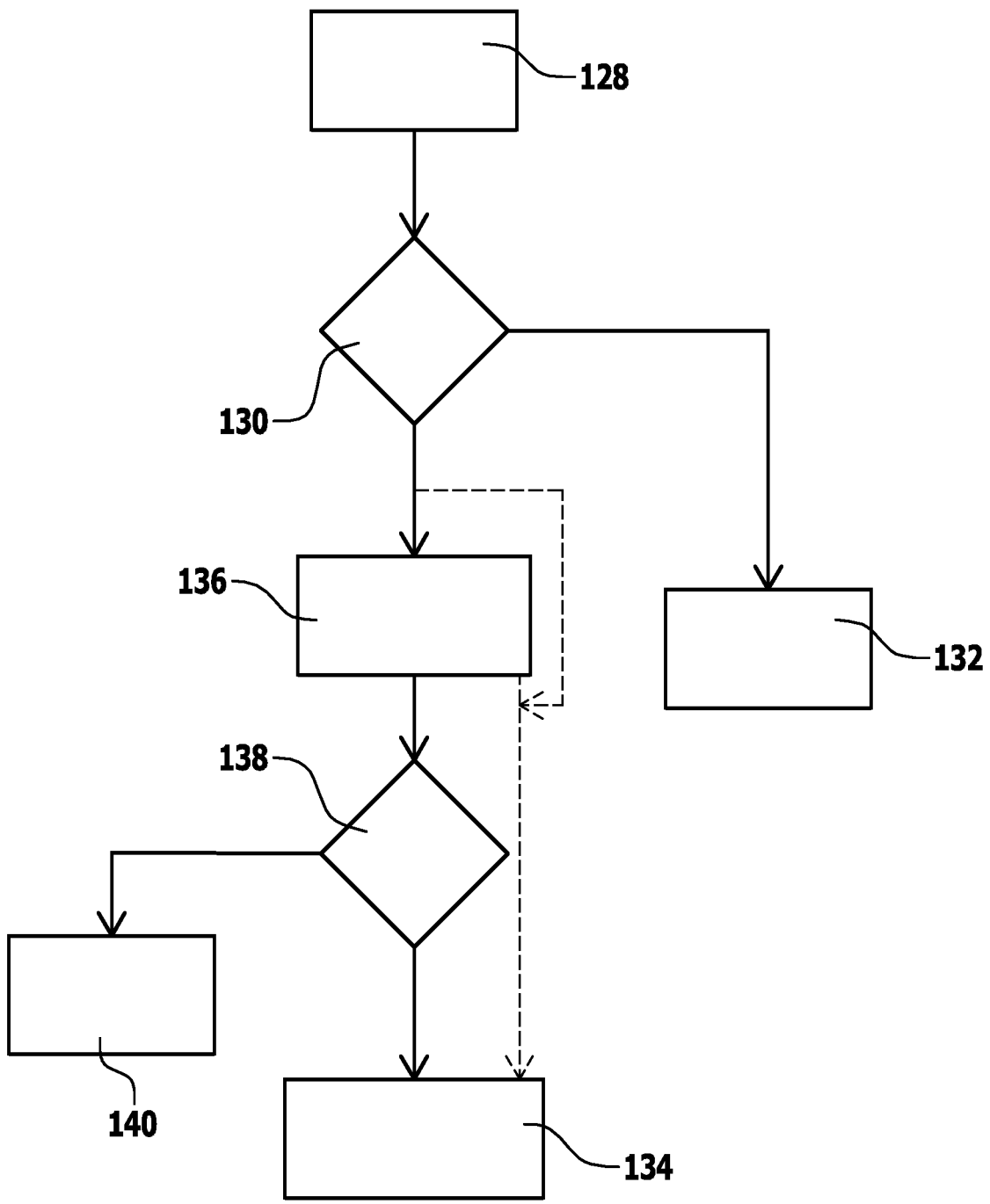
FIG. 6 is an exemplary embodiment of a flow chart for performing a test as to whether or not a filter cleaning operation is to be performed.

FIG. 6 is a schematic representation of the sequence:

First, in a computation step 128, the evaluation device 110 of the control device 98 calculates the quantity $c_w$ that characterizes the flow resistance of the filter 22.

Next, at a threshold value test step 130, a check is made as to whether or not the predetermined threshold value (and in particular a predetermined first threshold value) is exceeded. If the threshold value is not exceeded, normal suction operation is carried on or continued (reference numeral 132 in FIG. 6).

If the threshold value is found to be exceeded in the test, a filter cleaning operation is performed (reference numeral 134 in FIG. 6).

Provision may be made for an additional test procedure to be performed, checking for a "filter problem" and, for example, checking as to whether the filter 22 needs replacement.

To this end, a test is performed as to whether the first threshold value is exceeded multiple times within a specified time period or whether for example a second threshold value above the first threshold value is exceeded.

For example, after the result that the threshold value has been exceeded, this result is stored at a storing step 136.

In a further test step 138, a test is performed as to whether the threshold value has been exceeded a specified number of times within a specified period of time. If not, the filter cleaning operation 134 is performed.

If, at test step 138, the threshold value is determined to have been exceeded a specified number of times within the specified period of time, then this is an indication of a filter problem and, for example, a corresponding warning indication 140 is output.

In an exemplary embodiment, the control device 98 then controls a warning indication which is in particular arranged at a housing of the vacuum cleaner 10. The warning indication 142 may for example be a visual and/or audible warning indication.

If the test step 138 indicates that previous filter cleaning operations have failed to be successful, then this indicates filter problems; by way of the test at step 138, a determination can be made as to whether filter 22 recovery occurs, or no longer occurs, as a result of filter cleanings. If in performing this test it is determined that such recovery does not occur any longer, then for example a special cleaning procedure is required or the filter 22 must be exchanged.

For example, it is also possible for the test step 138 to include, as a measure of whether or not recovery is achieved, a test as to whether after the first threshold limit has been reached the second threshold value is exceeded, said second threshold value being higher than the first threshold value.

In the solution in accordance with the invention, filter cleaning is effected on an as-needed basis, depending on the conditions prevailing at the filter 22. The pressure loss Δp across the filter 22 is determined. In addition, the volume flow Q is determined, at least approximately, in order thus to be able to determine the conditions at the filter 22 independently of the remaining flow path inside the vacuum cleaner 10. To this end, in addition to the pressure loss Δp measured via the pressure values $p_1$ and $p_2$ from the first pressure sensor 84 and the second pressure sensor 86, the volume flow Q in the suction conduit 24 is determined, at least approximately. This in turn is determined from the characteristic curve 122 of the fan 28. The characteristic curve 122 is stored in the storage device 108, for example as a table of values, or a relationship approximating said characteristic curve 122 is stored in the storage device 108. A quantity Q that characterizes the volume flow is determined from the measured value $p_2$, and this is used to determine, by equation (1), a quantity $c_w$ characterizing the flow resistance at the filter 22. The "clogging conditions" at the filter 22 can thereby be determined directly and with good accuracy.

A loss coefficient $c_w$ of the filter 22 or a quantity proportional to the loss coefficient $c_w$ can be determined directly, and this quantity is capable of being determined with sufficient accuracy even under variations or fluctuations in operation of the vacuum cleaner 10.

Any potential influences on the pressure difference Δp in the flow path that are not attributable to a dirty filter condition (but rather, for example, to blockage inside the suction hose 18, changing to another attachment such as a nozzle 120, etc.) are taken into account automatically in the solution in accordance with the invention because it takes into account the volume flow in the suction conduit 24 for carrying out filter cleanings.

The method in accordance with the invention can be implemented using simple design.

The vacuum cleaning apparatus may also be integrated in a surface cleaning machine, such as a self-propelled sweeping machine.

REFERENCE SYMBOL LIST

10 vacuum cleaner
12 dirt collection container
14 suction head
16 suction inlet
18 suction hose
20 suction outlet
21 filter device
22 filter
24 suction conduit
25 electric motor device
26 suction unit
27 electric motor
28 fan
29 exhaust air opening
30 suction flow
32 dirty side
33 external air valve device
34 external air valve
36 valve holder
38 valve disk
40 closing spring
42 filter holder
44 stop spring
46 lateral opening
48 clean side
50 electromagnet
52 annular space
54 guide sleeve
56 iron plate
58 end edge
60 current supply line
62 control device
63 battery device
64 battery
66 battery
68 battery compartment
70 door
72 supply line
73 supply line
74 supply line
75 supply line
82 push button
84 first pressure sensor
86 second pressure sensor
88 mains voltage supply device
90 mains cable 92 rectifier
94 supply subunit
96 output
98 external air valve control subunit
100 signal line
102 controller
104 motor control subunit
106 determination device
108 storage device
110 evaluation device
112 threshold value test device
114 "heavy soiling"
116 "less-than-heavy soiling"
118 negative pressure
120 nozzle
122 fan characteristic curve
124 vacuum cleaner characteristic curve
126 point
128 computation sensor
130 threshold value test sensor
132 suction operation
134 filter cleaning operation
136 stored value
138 test sensor
140 warning indication
142 warning indication

The invention claimed is:

1. A method for cleaning a filter of a vacuum cleaning apparatus, wherein in operation of the vacuum cleaning apparatus the filter has suction air flowing therethrough, said suction air being generated by a fan, the method comprising:
    measuring a first pressure at an inflow section of the filter;
    measuring a second pressure at an outflow section of the filter;
    determining a pressure drop at the filter as a pressure difference between the first pressure and the second pressure;
    determining a quantity characterizing a volume flow of the suction air in the outflow section of the filter via a corresponding sensor or from a characteristic curve of the fan which indicates a dependence of the volume flow on a pressure in the outflow section of the filter; said pressure being measured as the second pressure and wherein the characteristic curve or a relationship approximating it was previously determined and is stored in a storage device;
    determining, from the pressure difference and the quantity that characterizes the volume flow, a quantity characterizing a flow resistance of the filter, wherein the quantity characterizing the flow resistance is determined as the quotient of the determined pressure difference and a function of the determined quantity that characterizes the volume flow; and
    initiating a filter cleaning operation in dependence upon the determined quantity that characterizes the flow resistance of the filter, wherein the determined quantity that characterizes the flow resistance is compared with a threshold value, and if said quantity is above the threshold value, a filter cleaning operation is initiated.

2. The method in accordance with claim 1, wherein the threshold value is or will be predetermined.

3. The method in accordance with claim 1, wherein the quantity characterizing the volume flow is determined from a characteristic curve of the fan which indicates a dependence of the volume flow on a pressure in the outflow section of the filter.

4. The method in accordance with claim 1, wherein the quotient is calculated from the determined pressure difference and a power of the determined quantity that characterizes the volume flow.

5. The method in accordance with claim 1, wherein a test is performed as to whether the threshold value is exceeded multiple times within a specified period of time.

6. The method in accordance with claim 1, wherein a test is performed to determine if, after the exceeding of a threshold value which is a first threshold value, a second threshold value is exceeded, said second threshold value being greater than the first threshold value.

7. The method in accordance with claim 6, wherein a warning signal is output if at least one of the following occurs: (i) the first threshold value is exceeded a minimum number of times within the specified time period and (ii) the second threshold value is exceeded.

8. The method in accordance with claim 1, wherein the filter has external air admitted thereto for carrying out a filter cleaning operation.

9. The method in accordance with claim 8, wherein an external air valve device is controlled and, for cleaning the filter, brought from a closed valve position to an open valve position.

10. The method in accordance with claim 1, wherein initiating a filter cleaning operation comprises at least one of mechanical shaking of the filter and directing external air towards the filter.

* * * * *